United States Patent
Sano (10) Patent No.: US 9,223,107 B2
(45) Date of Patent: Dec. 29, 2015

(54) ADAPTER CORRECTING FOR GLASS THICKNESS AND FIELD LENS

(71) Applicant: MITUTOYO CORPORATION, Kanagawa (JP)

(72) Inventor: Hidekazu Sano, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 234 days.

(21) Appl. No.: 13/834,166

(22) Filed: Mar. 15, 2013

(65) Prior Publication Data
US 2013/0265663 A1 Oct. 10, 2013

(30) Foreign Application Priority Data

Apr. 5, 2012 (JP) ................................. 2012-086354

(51) Int. Cl.
G02B 7/02 (2006.01)
G02B 15/14 (2006.01)
H04N 5/225 (2006.01)
G03B 9/08 (2006.01)
G02B 27/00 (2006.01)
G02B 7/00 (2006.01)
G02B 21/02 (2006.01)

(52) U.S. Cl.
CPC ................ G02B 7/021 (2013.01); G02B 7/006 (2013.01); G02B 21/02 (2013.01); G02B 27/0025 (2013.01)

(58) Field of Classification Search
CPC .. G11B 7/0932; G11B 7/0935; H04N 5/2254; G03B 9/22; G03B 9/42; G03B 9/02; G03B 7/04; G02B 3/00; G02B 135/005; G02B 13/00; G02B 15/177; G02B 15/161; G02B 15/173; G02B 15/14; G02B 5/205; G02B 5/223; G02B 26/007; G02B 7/102; G02C 7/08

USPC ......... 359/885, 888–889, 694, 704, 811–830, 359/739–740, 722–723, 691–692, 359/676–677; 348/342, 360–361; 396/449, 396/450, 505
See application file for complete search history.

(56) References Cited

U.S. PATENT DOCUMENTS

| 2,073,314 | A | 3/1937 | Mihalyi |
| 4,682,859 | A * | 7/1987 | Togino et al. ................. 359/656 |
| 2006/0098307 | A1 | 5/2006 | Campeans |
| 2010/0111519 | A1 | 5/2010 | Kobayashi |

FOREIGN PATENT DOCUMENTS

| DE | 2746 | C | 3/1878 |
| JP | 61-16526 | | 1/1986 |
| JP | 2839263 | B2 | 12/1998 |
| JP | 2004-112661 | A | 4/2004 |

OTHER PUBLICATIONS

Search report from E.P.O., mail date is Sep. 16, 2013.

* cited by examiner

*Primary Examiner* — Dawayne A Pinkney
(74) *Attorney, Agent, or Firm* — Greenblum & Bernstein, P.L.C.

(57) ABSTRACT

The adapter correcting for glass thickness includes an adapter main body, a plane parallel plate, and a retainer. The adapter main body includes an attacher/detacher capable of attaching and detaching with respect to an adapter connecter on the lens barrel; a tubular accommodator extending from the attacher/detacher toward the objective along an optical axis of the field lens; and a tongue provided on the attacher/detacher side of the accommodator. The plane parallel plate includes two mutually parallel flat surfaces and is inserted into the accommodator such that the two flat surfaces are orthogonal to the optical axis of the field lens. The retainer is attached to an end of the accommodator closest to the objective and holds the plane parallel plate between the retainer and the tongue. The accommodator is formed to have a tubular length sufficient to insert at least two plane parallel plates.

14 Claims, 5 Drawing Sheets

ADAPTER CORRECTING FOR GLASS THICKNESS AND FIELD LENS

CROSS-REFERENCE TO RELATED APPLICATIONS

The present application claims priority under 35 U.S.C. §119 of Japanese Application No. 2012-086354, filed on Apr. 4, 2012, the disclosure of which is expressly incorporated by reference herein in its entirety.

BACKGROUND OF THE INVENTION

1. Field of the Invention

The present invention relates to an adapter correcting for glass thickness and to a field lens to which the adapter correcting for glass thickness is attached.

2. Description of Related Art

Conventionally, a field lens accommodating a plurality of lenses within a lens barrel is known which is capable of correcting, through design of the field lens, aberrations due to thickness of a glass plate when an objective is observed through the glass plate. However, such a field lens may be unable to achieve adequate optical performance in a case where the thickness of the glass plate between the objective and the field lens varies.

In response, a configuration is known in which an adapter correcting for glass thickness is provided to a field lens correcting for glass thickness as a separate component (see, e.g., Japanese Utility Model Publication No. S61-016526). The adapter correcting for glass thickness described in Japanese Utility Model Publication No. S61-016526 includes an attachment frame and a plane parallel plate. The attachment frame is capable of attachment and detachment with respect to a forefront end of a lens barrel of the field lens. The plane parallel plate is held by the attachment frame. The adapter correcting for glass thickness is attached to the field lens according to the thickness of the glass plate interposed between the field lens and the objective. For example when a glass plate having a thickness of 2 mm is interposed between the objective and a field lens designed assuming interposition of a glass plate having a thickness of 5 mm, an adapter correcting for glass thickness is mounted to the lens barrel of the field lens, the adapter including a plane parallel plate having a thickness of 3 mm. Accordingly, the objective can be observed with the field lens with an adequate optical performance even when the thickness of the glass plate is 2 mm.

Alternatively, a field lens is known which corrects for aberrations corresponding to thickness of a glass plate by displacing a lens within the field lens along an optical axis (see, e.g., Japanese Patent No. 2839263). The field lens of Japanese Patent No. 2839263 corrects aberrations due to the thickness of glass in the glass plate interposed between the objective and the field lens by displacing one of three lens groups.

By attaching the adapter correcting for glass thickness to the field lens, the configuration described in Japanese Utility Model Publication No. S61-016526 specifies the thickness of a glass plate that can be accommodated. For example, when the adapter correcting for glass thickness includes the plane parallel plate having a thickness of 2 mm and the adapter is attached to the field lens designed assuming interposition of the glass plate having a thickness of 5 mm, only a glass plate having a thickness of 3 mm can be accommodated. However, cases where the thickness of the glass plate is 1 mm, 2 mm, or 4 mm, or a case where no glass plate is included, cannot be accommodated. Accordingly, in order to accommodate glass plates having these thicknesses, separate adapters correcting for glass thickness must be prepared having plane parallel plates of 4 mm, 3 mm, 1 mm, and 5 mm, thus increasing costs.

By attaching another, different adapter correcting for glass thickness to the attachment frame of the adapter correcting for glass thickness according to Japanese Utility Model Publication No. S61-016526, different glass plates can be accommodated. For example, when adapters correcting for glass thickness having plane parallel plates of 1 mm, 2 mm, and 3 mm are respectively prepared, each adapter is employed individually. Thereby, glass thicknesses of 4 mm, 3 mm, and 2 mm can be accommodated. In addition, by combining these adapters, glass thicknesses of 5 mm, 4 mm, and 3 mm can be accommodated. However, the attachment frame of the adapter correcting for glass thickness according to Japanese Utility Model Publication No. S61-016526 includes a mount for fixating the attachment frame to the lens barrel of the field lens. Thus, when several attachment frames are used, the size of the adapter increases by the size of the mounts. In such a case, a distance between the objective and a surface of the adapter closest to the objective is reduced. Accordingly, the distance to which the field lens is able to advance and retreat with respect to the objective (operating distance) is also reduced. Adequate focus adjustment may therefore be impossible and functionality of the field lens may be reduced.

In addition, in a configuration where the lens position within the field lens is displaced, as in Japanese Patent No. 2839263, the configuration displacing the lens may become complicated and increase costs.

SUMMARY OF THE INVENTION

The present invention provides an adapter correcting for glass thickness and a field lens capable of preventing reduced functionality in the field lens at a low cost.

An adapter correcting for glass thickness according to the present invention is attachably and detachably provided to a field lens comprising a lens barrel having a tubular shape and a plurality of lenses accommodated within the lens barrel. The field lens uses the plurality of lenses to correct aberrations due to a glass plate having a predetermined thickness being interposed between the lens barrel and an objective. The adapter correcting for glass thickness includes an adapter main body, a plane parallel plate, and a retainer. The adapter main body includes an attacher/detacher capable of attaching and detaching with respect to an end of the lens barrel closest to the objective; an accommodator having a tubular shape provided extending from the attacher/detacher toward the objective and axially centered on an optical axis of the field lens; and a tongue provided on the objective side of the accommodator, projecting inward from an inner circumferential surface of the accommodator tube. The plane parallel plate is translucent and includes two mutually parallel flat surfaces. The plane parallel plate is inserted within the accommodator in a state such that the two flat surfaces are orthogonal to the optical axis of the field lens. The retainer is attached to an end of the accommodator closest to the objective and holds the plane parallel plate between the retainer and the tongue in a state where the plane parallel plate is inserted within the accommodator. The accommodator is formed to have a tubular length sufficient to insert at least two plane parallel plates.

In the present invention, the accommodator is provided to the adapter main body and at least two plane parallel plates can be inserted into the accommodator. The retainer is then attached to the end of the accommodator closest to the objective in a state where the plane parallel plates are accommodated within the accommodator. Thereby, the two planes of the plane parallel plates are fixed in place by the retainer and the tongue on the adapter main body in a state orthogonal to the optical axis of the field lens. In this configuration, the accommodator accommodates plane parallel plates having a thickness corresponding to the thickness of the glass plate interposed between the field lens and the objective. Thereby, the configuration can adequately correct aberrations due to the plurality of lenses in the field lens. In addition, two or more plane parallel plates can be inserted in the accommodator. Thus, even when there is no plane parallel plate of a corresponding thickness, a plurality of plane parallel plates may be stacked and inserted into the accommodator. Accordingly, there is no need to prepare a number of plane parallel plates corresponding to the thicknesses of the glass plates and costs can be reduced. In addition, in the present invention, even when several plane parallel plates are employed in this way, the plane parallel plates are inserted in the accommodator of a single adapter main body. Therefore, compared to a conventional case, for example, in which a plurality of adapters are stacked and mounted on the lens barrel of the field lens, a reduction in operating distance can be inhibited. Specifically, in order to mount a plurality of plane parallel plates, the plane parallel plates are simply inserted into the accommodator. Therefore, a mount for latching and mounting using screw mounting or latching pins is rendered unnecessary and the corresponding reduction in operating distance can be inhibited. Thus, a sufficient operating distance can be ensured between the field lens and the objective and reduced functionality of the field lens can be inhibited.

The adapter correcting for glass thickness according to the present invention preferably includes a frame body holding an outer circumference of the plane parallel plate. The frame body preferably includes an outer circumferential surface capable of contact with the inner circumferential surface of the accommodator tube around a circumferential direction. The plane parallel plate is preferably accommodated in the accommodator while being held by the frame body.

In the present invention, the plane parallel plate is inserted into the accommodator while being held by the frame body. By employing the frame body in this way, direct manual contact with the plane parallel plate is prevented, and thus fingerprints and foreign bodies can be prevented from adhering to the plane parallel plate. In addition, a configuration is employed in which the outer circumferential surface of the frame body contacts the interior circumference of the accommodator tube. Accordingly, instability between the frame body and the accommodator can be prevented and the plane parallel plate can be accurately inserted into the accommodator such that the two planes of the plane parallel plate are orthogonal to the optical axis of the field lens.

In the adapter correcting for glass thickness according to the present invention, the frame body preferably includes an inner circumferential tube surface contacting the outer circumferential surface of the plane parallel plate. The frame body also preferably includes a contact projecting from the inner circumferential tube surface toward a center axis of the inner circumferential tube surface, the contact contacting the plane parallel plate on one surface. The adapter correcting for glass thickness preferably includes a retaining ring engaged with the inner circumferential tube surface and fixating the plane parallel plate between the contact and the retaining ring.

In the present invention, the plane parallel plate is pinched and fixated between the contact of the frame main body and the retaining ring. Thereby, instability of the plane parallel plate can be more reliably prevented and the two planes of the plane parallel plate can be more accurately held in a state orthogonal to the optical axis of the field lens when the plane parallel plate is inserted into the accommodator.

In the adapter correcting for glass thickness according to the present invention, a first frame body holding a first plane parallel plate and a second frame body holding a second plane parallel plate are preferably included as the frame body capable of being inserted into the accommodator. The first frame body preferably includes a tab projecting toward the second frame body. The second frame body preferably includes a latch engaging with the tab.

When inserting two plane parallel plates into the accommodator, a first plane parallel plate is held by the first frame body and a second plane parallel plate is held by the second frame body for insertion into the accommodator. At that time, in the present invention, by engaging the tab of the first frame body with the latch of the second frame body, the first frame body and the second frame body can be united in one body. By uniting the first frame body and the second frame body in one body in this way, work to insert the frame body into the accommodator can be simplified and work efficiency can be improved.

In the adapter correcting for glass thickness according to the present invention, the second frame body preferably includes a tab projecting toward the first frame body. The first frame body preferably includes a latch engaging with the tab projecting from the second frame body. In the present invention, the tab and latch are provided to both the first frame body and the second frame body. Specifically, shapes of the first and second frame bodies can be identical. Standardization of the frame body can thus be achieved and, accordingly, the cost of the frame body can be reduced.

A field lens according to the present invention includes a lens barrel having a tubular shape and a plurality of lenses accommodated within the lens barrel. The field lens uses the plurality of lenses to correct aberrations due to a glass plate having a predetermined thickness being interposed between the lens barrel and an objective. The adapter correcting for glass thickness described above is attached to an end of the lens barrel closest to the objective.

In the present invention, similar to the invention described above, the number of plane parallel plates inserted into the accommodator and plate thickness of the plane parallel plates accommodated in the accommodator can be readily changed according to the thickness of the glass plate interposed between the field lens and the objective. A plurality of glass plates having different thicknesses can thus be accommodated. In addition, because the plane parallel plates can be used in combination, the number of plane parallel plates prepared can be reduced as compared to a case where, for example, the number of plane parallel plates prepared corresponds to the type of glass plate. A reduction in costs is therefore possible. Moreover, even when the plurality of plane parallel plates are used in combination, reduction of the operating distance can be inhibited and reduced functionality of the field lens can be inhibited.

The adapter correcting for glass thickness according to the present invention can achieve a reduction in costs by combining a plurality of plane parallel plates and can inhibit reduction of the operating distance even when the plurality of plane parallel plates are used in combination, thus enabling reduced functionality of the field lens to be prevented.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

Hereafter, a first embodiment of the present invention is described with reference to the drawings.

[Configuration of Field Lens]

Figure 1:
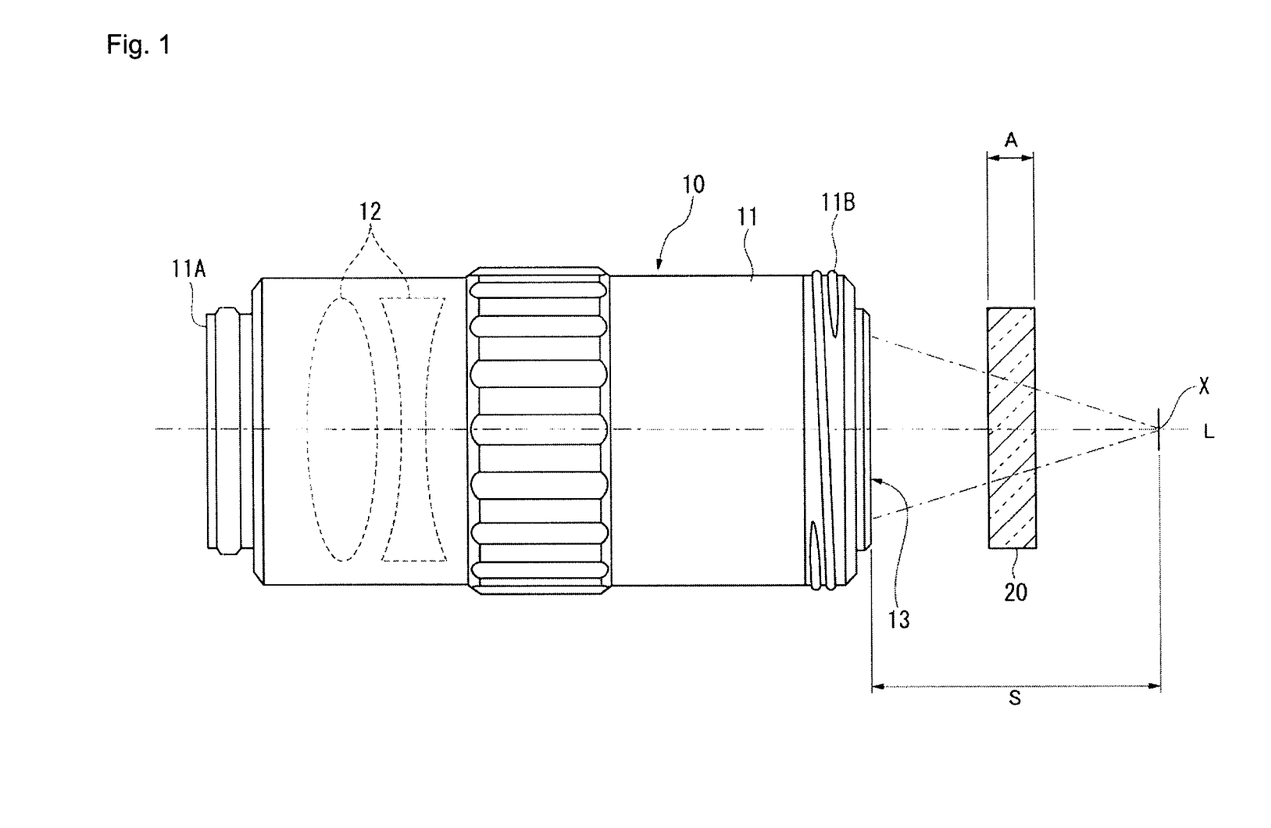
FIG. 1 illustrates a schematic configuration of a field lens according to a first embodiment of the present invention.

FIG. 1 illustrates a schematic configuration of a field lens according to a first embodiment of the present invention. As shown in FIG. 1, a field lens 10 includes a lens barrel 11 and a plurality of lenses 12 accommodated within the lens barrel 11. The field lens 10 is attachably and detachably provided to a main body (not shown in the drawing) of a measurement device (observation device) such as a microscope. Incident light from an objective X is guided through the plurality of lenses 12 to the main body of the measurement device and, for example, forms a real image on an imaging screen within the device main body.

The lens barrel 11 is formed in a substantially cylindrical tubular shape in which an end opposite the objective X and an end on a side attached to the device main body are open. As described above, the plurality of lenses 12 are accommodated on an interior of the lens barrel 11, fixed in predetermined lens positions. A lens mounter 11A is provided on a device main body side of the lens barrel 11, the lens mounter 11A capable of attaching to the device main body. The lens mounter 11A may be configured with threading capable of screwing onto the device main body, for example, or may have any other configuration. An adapter connector 11B for attaching an adapter 100 correcting for glass thickness is provided to a forefront side of the lens barrel 11 opposite the objective X. As shown in FIG. 1, the present embodiment is exemplified by a configuration in which the adapter connector 11B includes the threading (male screw) and an attacher/detacher 111 (described hereafter) provided to the adapter 100 is screwed onto the adapter connecter 11B. However, other configurations may also be employed. For example, the adapter connector 11B may also be configured to include latching pins which engage and latch with latching grooves provided to the attacher/detacher 111 in order to attach the adapter 100 correcting for glass thickness to the field lens 10.

The field lens 10 of the present embodiment is designed so as to correct aberrations due to plate thickness of a glass plate 20 when observing the objective X through the glass plate 20, which has a thickness A. Specifically, the plurality of lenses 12 have a lens shape designed to correct the aberrations due to the plate thickness A of the glass plate 20, as well as aberrations due to the lenses 12.

As shown in FIG. 1, when the glass plate 20 of thickness A is interposed between the objective X and the field lens 10 described above, the field lens 10 can correct aberrations due to the glass plate 20 using the plurality of lenses 12. However, when the glass plate interposed between the field lens 10 and the objective X has a different thickness, the aberrations due to the thickness of the glass plate 20 cannot be adequately corrected. In such a case, adequate aberration correction by the plurality of lenses 12 is enabled in the present embodiment by attaching the adapter 100 correcting for glass thickness to the adapter connector 11B of the field lens 10 (see FIG. 2). Hereafter, a configuration of the adapter 100 correcting for glass thickness is described in detail.

[Configuration of Adapter Correcting for Glass Thickness]

Figure 2:
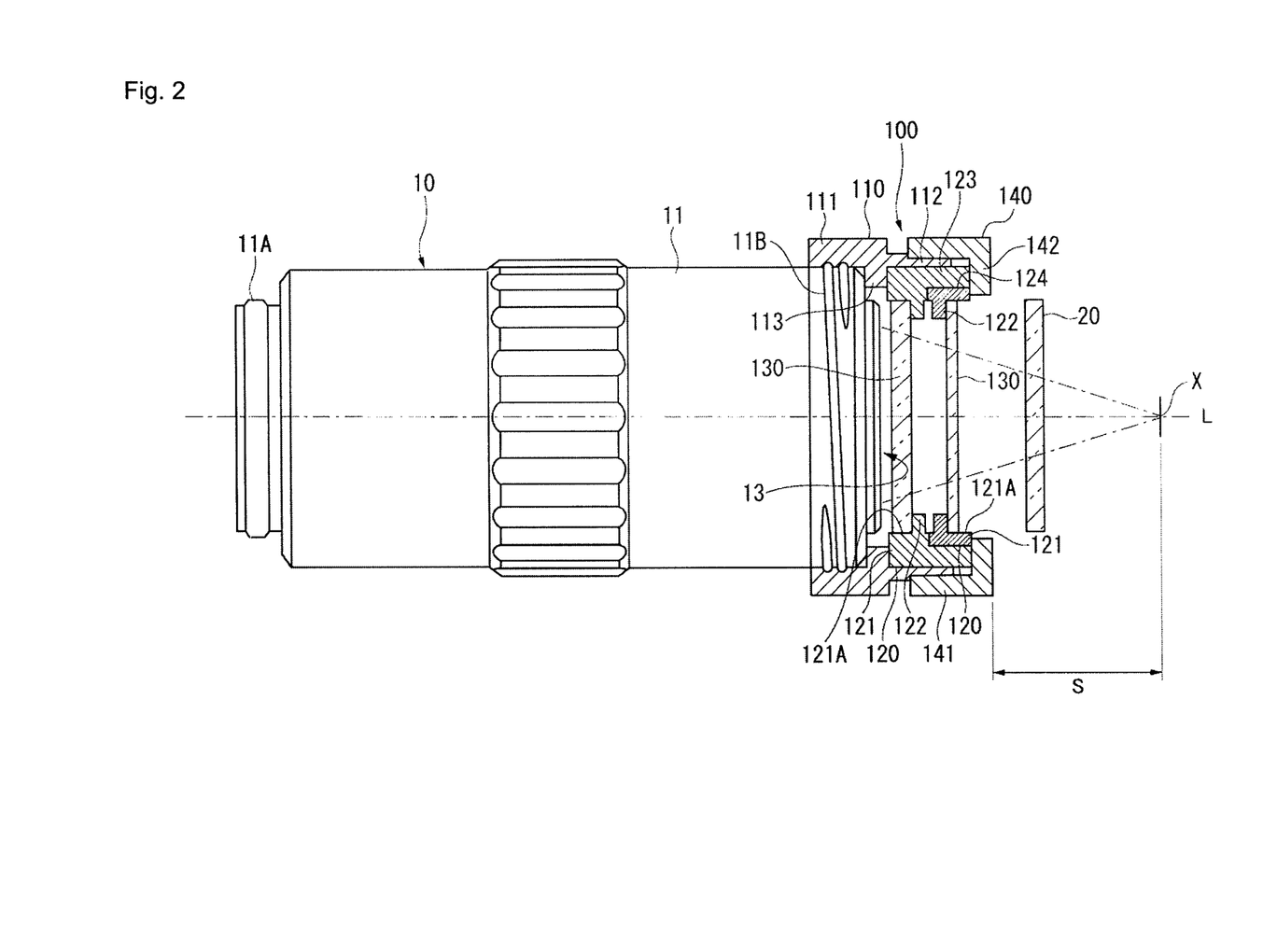
FIG. 2 illustrates a schematic configuration of an adapter correcting for glass thickness according to the first embodiment.
Figure 3:
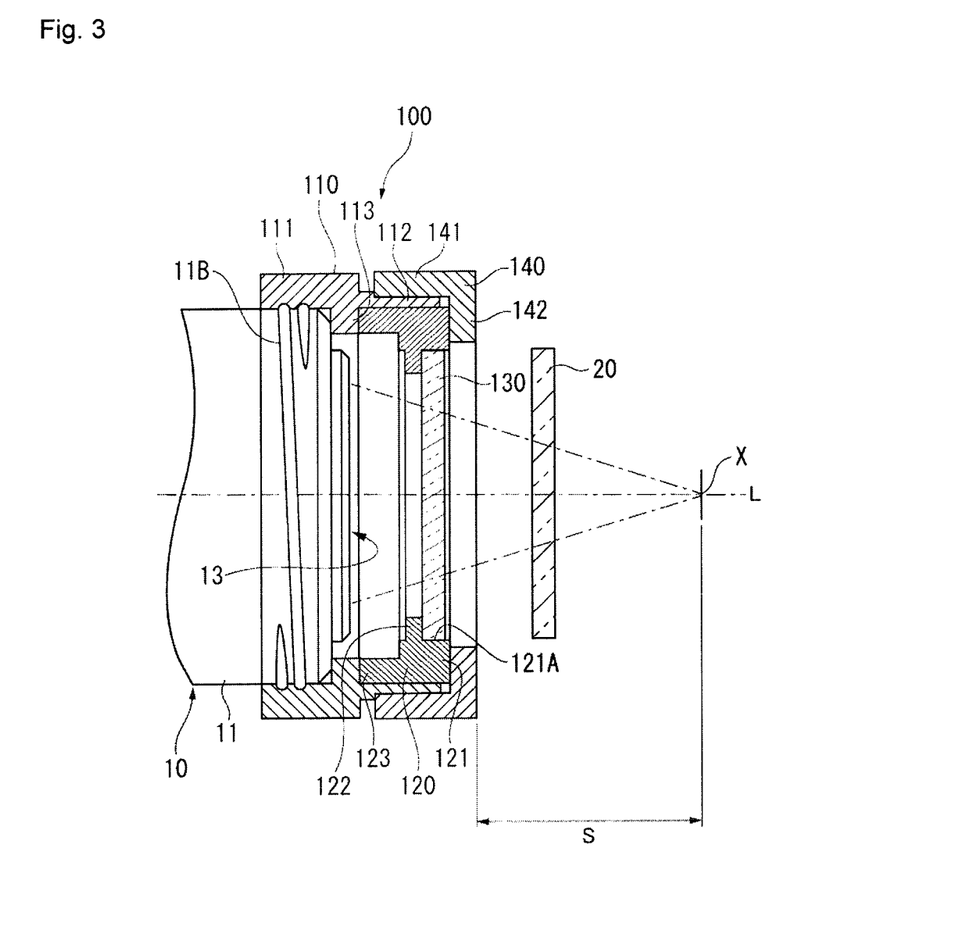
FIG. 3 illustrates a schematic configuration of the adapter correcting for glass thickness according to the first embodiment.

FIGS. 2 and 3 illustrate a schematic configuration of the adapter 100 correcting for glass thickness attached to the field lens 10. Herein, FIG. 2 illustrates a cross-section of a configuration for the adapter 100 correcting for glass thickness when two plane parallel plates 130 are used. FIG. 3 illustrates a cross-section of a configuration for the adapter 100 correcting for glass thickness when one plane parallel plate 130 is used. As shown in FIGS. 2 and 3, the adapter 100 correcting for glass thickness includes an adapter main body 110, a frame body 120, a plane parallel plate 130, and a retainer 140.

The adapter main body 110 includes the attacher/detacher 111 capable of attaching and detaching with respect to the adapter connector 11B; an accommodator 112 extending from the attacher/detacher 111 toward the objective X; and a tongue 113 provided to the attacher/detacher 111 side of the accommodator 112. The attacher/detacher 111 is formed in a cylindrical tubular shape with an inner circumference greater than an outer circumference of the lens barrel 11. Threading corresponding to the threading on the adapter connector 11B is provided on the tube-interior circumferential surface of the attacher/detacher 111. Thereby, the attacher/detacher 111 can be detachably attached to the adapter connecter 11B. Moreover, as described above, a configuration mounting the attacher/detacher 111 on the adapter connector 11B is not limited to the above. The adapter connector 11B may also, for example, be configured to include the latching pins while the attacher/detacher 111 includes latching grooves capable of engaging and latching with the latching pins.

The accommodator 112 is formed in a cylindrical tubular shape and, when the adapter main body 110 is attached to the field lens 10, an optical axis L of the plurality of lenses 12 matches a center axis of the cylindrical tube of the accommodator 112. A diameter of a tube-interior circumferential surface of the accommodator 112 is formed to have substantially the same diameter as the tube-interior circumferential surface of the attacher/detacher 111 and a tube-exterior circumferential surface of the accommodator 112 is formed to have a diameter smaller than that of the attacher/detacher 111. In addition, threading for engaging with the retainer 140 is provided on the tube-exterior circumferential surface of the accommodator 112. In addition, in the present embodiment, the accommodator 112 is formed to have a tubular length capable of inserting one or two frame bodies 120 into a tube-interior circumference. Moreover, the diameter of the accommodator 112 is not limited to the above. The diameter of the accommodator 112 tube-interior circumferential surface may, for example, be smaller than that of the attacher/detacher 111. In such a case, however, an effective aperture may be reduced by a portion of the frame body 120 inserted within the accommodator 112. When the thickness of the frame body 120 becomes smaller along the diameter direction (radiation direction away from the center axis) in response to the inner circumferential diameter of the accommodator 112, strength of the frame body 120 is reduced. Moreover, when the diameter of the tube-exterior circumferential surface of the accommodator 112 becomes larger, the retainer 140, which engages with the accommodator 112, also increases in size. For these reasons, the above-described dimensions are preferred.

The tongue 113 is provided on an attacher/detacher 111 side of the accommodator 112, projecting toward the center axis of the cylindrical tube of the accommodator 112 (the optical axis L of the field lens 10) from the inner circumferential surface of the accommodator 112. Moreover, an amount of projection in the diameter direction of the tongue 113 is approximately the thickness of the lens barrel 11, for example, and does not overlap with a light incidence aperture 13 on the field lens 10. The tongue 113 of this kind may be formed in an annular shape provided around the circumferential direction of the inner circumferential surface of the accommodator 112, or may be configured by a projecting tab projecting from a portion of the inner circumferential surface of the accommodator 112. In addition, an end surface of the tongue 113 on the device main body side contacts the end surface on the objective X side of the lens barrel 11 when the adapter 100 correcting for glass thickness is mounted to the field lens 10. An end surface of the tongue 113 on the objective X side contacts the frame body 120 inserted within the accommodator 112.

Figure 4:
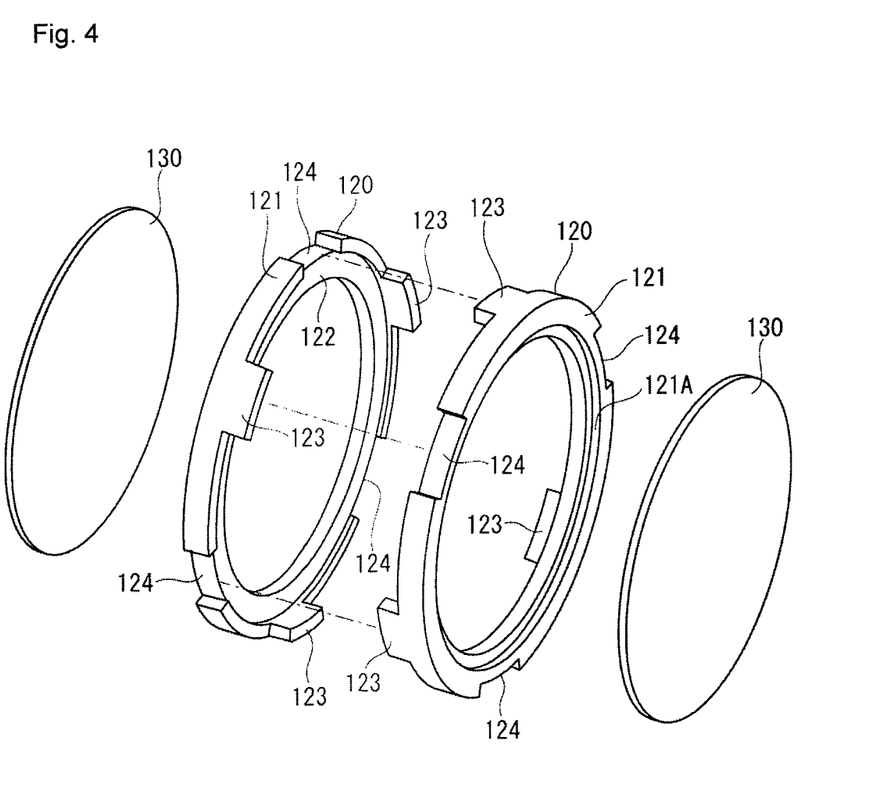
FIG. 4 is a perspective view of a frame body and plane parallel plates according to the first embodiment.

The frame body 120 is a framing member holding the plane parallel plate 130 and is inserted into the accommodator 112 of the adapter main body 110 while holding the plane parallel plate 130. FIG. 4 is a perspective view illustrating a schematic configuration of the frame body 120. As shown in FIGS. 2 to 4, the frame body 120 includes a frame main body 121 having a cylindrical tubular shape; a contact 122 provided to the inner circumferential surface (inner circumferential tube surface 121A) of the frame main body 121; tabs 123 projecting from the frame main body 121; and latches 124 in which a portion of the frame main body 121 is cut away. The inner circumferential tube surface 121A of the frame main body 121 is formed to a diameter enabling the outer circumferential surface of the plane parallel plate 130 to contact the inner circumferential tube surface 121A. The tube-exterior circumferential surface of the frame main body 121 is formed to a diameter enabling contact with the inner circumferential surface of the accommodator 112. The contact 122 is provided toward a first end of the frame main body 121 and a surface of the contact 122 on the inner circumferential tube surface 121A side contacts the plane parallel plate 130. The contact 122 is formed to project such that an approximate amount of projection does not affect the effective aperture of the field lens 10. Moreover, in the present embodiment, an example of the contact 122 is described in which the contact 122 is provided in the annular shape around the entire circumferential direction of the inner circumferential tube surface 121A. However, the contact 122 may also be formed by a projecting tab projecting from a portion of the inner circumferential tube surface 121A, for example. In such a case, a plurality of projecting tab-shaped contacts 122 are preferably provided around the circumferential direction of the inner circumferential tube surface 121A.

The tabs 123 are projecting tabs having a predetermined width projecting from a first end surface of the frame main body 121 along a straight line direction parallel to the center axis of the cylindrical tube of the inner circumferential tube surface 121A. A plurality of tabs 123 are provided at equal angular intervals (for example, intervals of 120°) with respect to the center axis of the cylindrical tube of the inner circumferential tube surface 121A. In addition, an amount of projection for the tabs 123 is not particularly limited. However, the tabs 123 are preferably formed to have an amount of projection equal to or less than a tubular length along an axis direction of the frame main body 121. The latches 124 are provided on the outer circumferential surface of the frame main body 121 from a first cylindrical tube end surface to a second end surface at the same width as the tabs 123. Specifically, in the present embodiment, when two frame bodies 120 are employed, the two frame bodies 120 are inserted into the accommodator 112 in a state where the two frame bodies 120 are combined to form one body. At this point, the tabs 123 of one frame body 120 (a first frame body in the present invention) are engaged and latched to the latches 124 of another frame body 120 (a second frame body in the present invention), and the tabs 123 of the second frame body 120 are engaged and latched to the latches 124 of the first frame body 120. Herein, as described above, when the amount of projection of the tabs 123 is equal to or less than a tubular length of the frame main body 121, the tabs 123 do not stick out beyond the end surface of the frame main body 121. The size of the united body can thus be reduced when two frame bodies 120 are combined.

The plane parallel plate 130 is a glass plate having two flat surfaces that are mutually parallel. The two flat surfaces are each formed to be circular. An outer circumferential surface adjacent to the two flat surfaces is provided perpendicular with respect to the two flat surfaces. In addition, the inner circumferential tube surface 121A of the frame body 120 contacts (fits around) the outer circumferential surface of the plane parallel plate 130, thereby fixing the plane parallel plate 130 to the frame body 120.

The retainer 140 includes a mount 141 and a retainer tab 142. The mount 141 has a cylindrical tubular shape and includes threading on a tube-interior circumferential surface. The mount 141 is screwed onto the threading provided on the outer circumferential surface of the accommodator 112. Moreover, the mounting of the mount 141 on the accommodator 112 is not limited to screwing together threaded portions. For example, latching pins formed on either one of the mount 141 and the accommodator 112 may be engaged and latched with latching grooves formed on the other of the mount 141 and the accommodator 112. The retainer tab 142 projects toward an inner diameter from an end surface of the mount 141 on the objective X side. By mounting the mount 141 on the accommodator 112, the retainer tab 142 presses the frame body 120 inserted within the accommodator 112 toward the tongue 113. Specifically, along with the tongue 113, the retainer tab 142 pinches and fixates the frame body 120. Similar to the tongue 113 and the contact 122, the retainer tab 142 may have an annular shape and be provided around the circumferential direction of the mount 141, or may be configured with a plurality of projecting tabs projecting toward the inner diameter from portions along the circumferential direction of the mount 141.

[Method of Mounting Adapter Correcting for Glass Thickness]

Next, a method of mounting the above-described adapter 100 correcting for glass thickness on the field lens 10. In mounting the adapter 100 correcting for glass thickness, the attacher/detacher 111 on the adapter main body 110 is first mounted on the adapter connector 11B of the lens barrel 11 and brought into contact with a first end surface of the tongue 113 and the end surface of the lens barrel 11. Then, the frame body 120 holding (fitting around) the plane parallel plate 130 is inserted into the accommodator 112 of the adapter main body 110.

At this point, when aberration correction is performed using one plane parallel plate 130 (as shown in FIG. 3), one frame body 120 holding the plane parallel plate 130 is inserted into the accommodator 112 and an end surface of the frame body 120 on an insertion forefront side is brought into contact with the tongue 113. When two frame bodies 120 are used, as described above, the tabs 123 on the first frame body 120 are engaged and latched to the latches 124 on the second frame body 120, and the tabs 123 on the second frame body 120 are engaged and latched to the latches 124 on the first frame body 120, thus uniting the two frame bodies 120 into one body. Then, the united frame bodies 120 are inserted into the accommodator 112 and the end surface on the insertion forefront side of the frame bodies 120 is brought into contact with the tongue 113. Herein, the outer circumferential surface of the frame body 120 contacts the inner circumferential surface of the accommodator 112 and the outer circumferential surface of the plane parallel plate 130 contacts the inner circumferential cylinder surface 121A, thereby enabling the two flat surfaces of each of the plane parallel plates 130 to be held in a state orthogonal to the optical axis L of the field lens 10. Thereafter, the retainer 140 is mounted on the accommodator 112 of the adapter main body 110 and the frame body 120 is pressed by the retainer tab 142. Thereby, the frame body 120 is pinched and fixated by the tongue 113 and the retainer tab 142. Accordingly, the adapter 100 correcting for glass thickness is mounted on the field lens 10.

[Selection of Plane Parallel Plate]

Next, a method is described for selecting the plane parallel plate 130 for the plate thickness of the glass plate 20 interposed between the field lens 10 and the objective X. As described above, when the glass plate 20 having a plate thickness of the predetermined thickness A is inserted, the plurality of lenses 12 in the field lens 10 are designed to enable aberrations arising from the glass plate 20 to be corrected. Therefore, when a glass plate 20 having a plate thickness less than the thickness A is interposed, adequate aberration correction cannot be performed. In such a case, in the present embodiment, the plane parallel plate 130 is selected such that a sum of the plate thickness of the glass plate 20 and the plate thickness of the plane parallel plate 130 equals the thickness A at which the lenses 12 can correct aberrations. When two plane parallel plates 130 are used, two plane parallel plates 130 are selected such that the sum of the plate thicknesses of the two plane parallel plates 130 and the plate thickness of the glass plate 20 equals the thickness A at which the lenses 12 can correct aberrations.

In the present embodiment, it is possible to insert one frame body 120 (plane parallel plate 130) into the accommodator 112, and also to insert two combined frame bodies 120 (plane parallel plates 130) into the accommodator 112. Employing a configuration in which the frame bodies 120 (plane parallel plates 130) can be freely selected in this way enables a plurality of glass plate 20 thicknesses to be accommodated with a small number of plane parallel plates 130. For example, when 5 mm is the thickness of the glass plate 20 at which the plurality of lenses 12 in the field lens 10 can correct aberrations, three frame bodies 120 holding plane parallel plates 130 having thicknesses of 1 mm, 2 mm, and 3 mm, respectively, are prepared. Thereby, the glass plate 20 can be accommodated at a thickness of 1 mm, 2 mm, 3 mm, and 4 mm, as well as when no glass plate 20 is provided. Specifically, in a case where the thickness of the glass plate 20 is 4 mm, the frame body 120 holding the 1 mm plane parallel plate 130 is mounted in the accommodator 112. When the thickness of the glass plate 20 is 3 mm, the frame body 120 holding the 2 mm plane parallel plate 130 is mounted in the accommodator 112. Also, when the thickness of the glass plate 20 is 2 mm, the frame body 120 holding the 3 mm plane parallel plate 130 or a combination of the frame body 120 holding the 1 mm plane parallel plate 130 and the frame body 120 holding the 2 mm plane parallel plate 130 is mounted in the accommodator 112. When the thickness of the glass plate 20 is 1 mm, a combination of the frame body 120 holding the 1 mm plane parallel plate 130 and the frame body 120 holding the 3 mm plane parallel plate 130 is mounted in the accommodator 112. In addition, when no glass plate 20 is interposed, a combination of the frame body 120 holding the 2 mm plane parallel plate 130 and the frame body 120 holding the 3 mm plane parallel plate 130 is mounted in the accommodator 112.

The present embodiment is configured such that two plane parallel plates 130 are inserted into the accommodator 112 with one adapter 100 correcting for glass thickness. Therefore, compared to a case where several separate adapters are attached to the field lens 10, for example, a length of the field lens 10 along the optical axis L can be reduced. Accordingly, a reduction in an operating distance S (i.e., a distance in which the field lens 10 can be displaced so as to bring the field lens 10 into focus) when the adapters are attached can be inhibited and a reduction in functionality of the field lens 10 can be inhibited.

[Advantage of Present Embodiment]

The field lens 10 of the present embodiment is designed so as to enable aberrations due to the plate thickness of the glass plate 20 to be corrected by the plurality of lenses 12 when the glass plate 20 having the predetermined thickness A is interposed between the field lens 10 and the objective X. Even when the plate thickness of the glass plate 20 is changed, by mounting the adapter 100 correcting for glass thickness on the field lens 10, adequate correction of aberrations can be achieved by matching the sum of the thickness of the plane parallel plate 130 within the adapter 100 and the thickness of the glass plate 20 to the thickness A. In addition, the adapter 100 correcting for glass thickness includes the adapter main body 110 having the attacher/detacher 111 enabling attachment and detachment with respect to the lens barrel 11 of the field lens 10; the cylindrical tubular accommodator 112 projecting from the attacher/detacher 111 toward the objective X; and the tongue 113 provided to the attacher/detacher 111 side of the accommodator 112. The accommodator 112 of the adapter main body 110 is configured to enable two or more frame bodies 120 to be inserted into the tube-interior circumference, the frame bodies 120 holding the plane parallel plates 130. The adapter 100 correcting for glass thickness includes the retainer 140 pinching the frame bodies 120 between the retainer 140 and the tongue 113 when the frame bodies 120 are inserted within the accommodator 112. With such a configuration, two or more plane parallel plates 130 can be inserted into the accommodator 112 with one adapter 100 correcting for glass thickness. Therefore, as compared to a case when a plurality of adapters are linked for use, for example, the operating distance S of the field lens 10 can be adequately ensured. Accordingly, reduced functionality of the field lens 10 can be inhibited. In addition, in the present embodiment, two plane parallel plates 130 can be combined for use or one plane parallel plate 130 can be used alone. Therefore, glass plates 20 can be accommodated having a plurality of different thicknesses through combination of the plane parallel plates 130. For example, as compared to a case where one plane parallel plate is used corresponding to the plate thickness of the glass plate 20, costs can be reduced. In addition, the field lens 10 requires no structures for changing the positions of the lenses 12, leading to a reduction in costs in this way as well.

In the present embodiment, the outer circumferential surface of the plane parallel plate 130 contacts and is held by the inner circumferential tube surface 121A of the frame main body 121 of the frame body 120. In addition, the outer circumferential surface of the frame main body 121 of the frame body 120 contacts the inner circumferential surface of the accommodator 112. Thereby, instability between the plane parallel plate 130 and the frame body 120 or instability between the frame body 120 and the adapter main body 110 can be prevented. Also, the plane parallel plate 130 can be fixed in place in a state where the plane parallel plate 130 is orthogonal to the optical axis L of the field lens 10. Accordingly, adequate correction of aberrations can be performed by the lenses 12 of the field lens 10. In addition, in the configuration where the plane parallel plate 130 is held by the frame body 120, when the plane parallel plate 130 is inserted into the accommodator 112 of the adapter main body 110, for example, fingers can grip the frame body 120 and thus adhesion of fingerprints or grime on the plane parallel plate 130 can be prevented.

In the present embodiment, the frame body 120 includes the tabs 123, projecting in the tube axis direction of the frame main body 121, and the latches 124, capable of engaging and latching with the tabs 123. With this configuration, when two frame bodies 120 are employed, the tabs 123 provided to each of the frame bodies 120 are engaged and latched to the latches 124 of the other frame body 120. Thereby, the two frame bodies 120 can be inserted into the accommodator 112 united in one body, and work efficiency when inserting the frame bodies 120 into the accommodator 112 can be improved. With the configuration providing the tabs 123 and the latches 124 at equal angular intervals with respect to the center axis of the cylindrical tube, each frame body 120 can be treated as interchangeable and manufacturing costs can be reduced.

Second Embodiment

Figure 5:
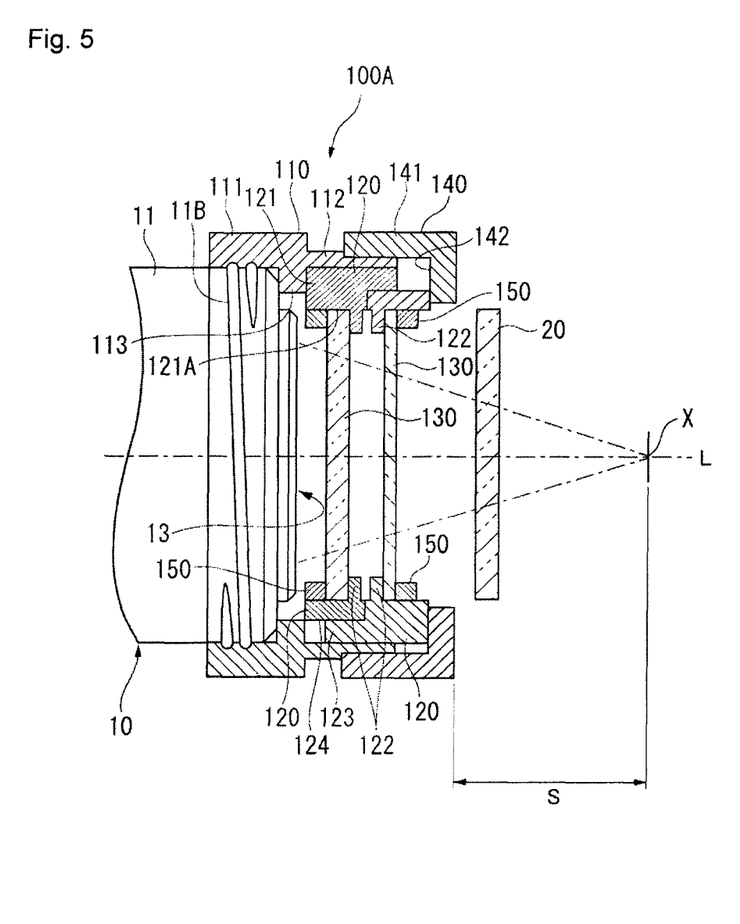
FIG. 5 illustrates a schematic configuration of an adapter correcting for glass thickness according to a second embodiment.

Next, a second embodiment according to the present invention is described with reference to the drawings. FIG. 5 illustrates a schematic configuration of an adapter 100A correcting for glass thickness according to the second embodiment. The adapter 100 correcting for glass thickness according to the first embodiment, described above, was configured such that the plane parallel plate 130 was fitted within the inner circumferential tube surface 121A of the frame body 120 (i.e., such that the plane parallel plate 130 was fixed to the frame body 120). In contrast, the second embodiment differs from the above-described first embodiment in that the plane parallel plate 130 is held so as to be attachable and detachable with respect to the frame body 120.

The adapter 100A correcting for glass thickness of the present embodiment includes threading on the inner circumferential tube surface 121A of the frame body 120. As shown in FIG. 5, a retaining ring 150 is mounted to the adapter 100A in a state where the plane parallel plate 130 is inserted into the inner circumferential tube surface 121A. The plane parallel plate 130 is pinched and fixated by the retaining ring 150 and the contact 122.

In such a configuration, the plane parallel plate 130 mounted on the frame body 120 can be swapped. Therefore, even when a plurality of plane parallel plates 130 (for example, three or more) are prepared in response to the plate thickness of the glass plate 20, a number of frame bodies 120 capable of being inserted into the accommodator 112 (for example, two) may be prepared, thus enabling a further reduction in costs. In addition, the plane parallel plate 130 can be reliably fixated on the frame body 120 with the retaining ring 150. Thus, the plane parallel plate 130 can be more reliably fixated in a state orthogonal to the optical axis L of the field lens 10.

Modifications

Moreover, the present invention is not limited to the above-described embodiments. The present invention includes modifications and improvements as long as the advantage of the present invention can be achieved. For example, in the above-described embodiments, the frame body 120 is interchangeable and the tabs 123 of the first frame body 120 engage and latch with the latches 124 of the second frame body 120 while the tabs 123 of the second frame body 120 engage and latch with the latches 124 of the first frame body 120. However, the present invention is not limited to this. For example, the present invention may be configured such that a frame body having only tabs is combined to form one body with a frame body having only latches. In addition, a frame body configured with only a frame main body and a contact may be used, without tabs and latches.

The above-described embodiments were configured such that the plane parallel plate 130 held by the frame body 120 is inserted into the accommodator 112. However, the present invention is not limited to this. For example, the present invention may be configured such that the plane parallel plate 130 is inserted directly into the accommodator 112. In such a case, the amount of projection of the accommodator 112 can be further reduced and the operating distance of the field lens 10 can be kept larger.

A configuration in which two frame bodies 120 could be inserted into the accommodator 112 was described as an example. However, the present invention may also be configured such that three or more frame bodies 120 can be inserted into the accommodator 112. Even in such a case, the operating distance can be kept large as compared to a configuration in which three or more adapters are linked together, for example.

Other specific structures in embodiments of the present invention can be modified as appropriate to alternative structures as long as the advantage of the present invention can be achieved.

The present invention can be employed as an adapter correcting for glass thickness attached and detached with respect to a field lens designed to enable correction of aberrations due to plate thickness of a glass plate of a predetermined thickness when the glass plate is interposed between the field lens and an objective.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An adapter correcting for glass thickness attachably and detachably provided to a field lens comprising a lens barrel having a tubular shape and a plurality of lenses accommodated within the lens barrel, the field lens using the plurality of lenses to correct aberrations due to a glass plate having a predetermined thickness being interposed between the lens barrel and an object-side objective, the adapter correcting for glass thickness comprising:
   an adapter main body comprising:
      an attacher/detacher capable of attaching and detaching with respect to an end of the lens barrel closest to the objective;
      an accommodator having a tubular shape extending from the attacher/detacher toward the objective and axially centered on an optical axis of the field lens; and
      a tongue provided on the objective side of the accommodator and projecting inward from an inner circumferential surface of the accommodator tube;
   a translucent plane parallel plate having two mutually-parallel flat surfaces, the plane parallel plate positioned within the accommodator such that the two flat surfaces are orthogonal with respect to the optical axis of the field lens; and
   a retainer attached to an end of the accommodator closest to the objective, the retainer holding the plane parallel plate between the retainer and the tongue in a state where the plane parallel plate is positioned within the accommodator,
   and wherein the accommodator has tubular length configured to accommodate at least two plane parallel plates therein.

2. The adapter correcting for glass thickness according to claim 1, further comprising:
   a frame body holding an outer circumference of the plane parallel plate, wherein
   the frame body comprises an outer circumferential surface configured to contact the inner circumferential surface of the accommodator tube about a circumferential direction, and
   the plane parallel plate is accommodated in the accommodator while being held by the frame body.

3. The adapter correcting for glass thickness according to claim 2, wherein the frame body comprises:
   an inner circumferential tube surface contacting the outer circumferential surface of the plane parallel plate; and
   a contact projecting from the inner circumferential tube surface toward a center axis of the inner circumferential tube surface, the contact contacting the plane parallel plate on one surface,
   wherein the adapter correcting for glass thickness further comprises a retaining ring engaged with the inner circumferential tube surface and fixating the plane parallel plate between the contact and the retaining ring.

4. The adapter correcting for glass thickness according to claim 2, wherein the frame body further comprises:
   a first frame body configured to hold a first plane parallel plate; and
   a second frame body configured to hold a second plane parallel plate,
   wherein the first frame body comprises a tab projecting toward the second frame body and the second frame body comprises a latch engaging with the tab.

5. The adapter correcting for glass thickness according to claim 3, wherein the frame body further comprises:
   a first frame body configured to hold a first plane parallel plate; and
   a second frame body configured to hold a second plane parallel plate,
   wherein the first frame body comprises a tab projecting toward the second frame body and the second frame body comprises a latch engaging with the tab.

6. The adapter correcting for glass thickness according to claim 4, wherein:
   the second frame body comprises a tab projecting toward the first frame body; and
   the first frame body comprises a latch engaging the tab projecting from the second frame body.

7. The adapter correcting for glass thickness according to claim 5, wherein:
   the second frame body comprises a tab projecting toward the first frame body; and
   the first frame body comprises a latch engaging the tab projecting from the second frame body.

8. A field lens comprising:
   a lens barrel having a tubular shape;
   a plurality of lenses accommodated within the lens barrel, wherein the field lens is configured to use the plurality of lenses to correct aberrations due to a glass plate having a predetermined thickness being interposed between the lens barrel and an objective,
   the adapter correcting for glass thickness according to claim 1 attached to an end of the lens barrel closest to the objective.

9. A field lens comprising:
   a lens barrel having a tubular shape;
   a plurality of lenses accommodated within the lens barrel, wherein the field lens is configured to use the plurality of lenses to correct aberrations due to a glass plate having a predetermined thickness being interposed between the lens barrel and an objective,
   the adapter correcting for glass thickness according to claim 2 attached to an end of the lens barrel closest to the objective.

10. A field lens comprising:
    a lens barrel having a tubular shape;
    a plurality of lenses accommodated within the lens barrel, wherein the field lens is configured to use the plurality of lenses to correct aberrations due to a glass plate having a predetermined thickness being interposed between the lens barrel and an objective,
    the adapter correcting for glass thickness according to claim 3 attached to an end of the lens barrel closest to the objective.

11. A field lens comprising:
    a lens barrel having a tubular shape;
    a plurality of lenses accommodated within the lens barrel, wherein the field lens is configured to use the plurality of lenses to correct aberrations due to a glass plate having a predetermined thickness being interposed between the lens barrel and an objective, the adapter correcting for glass thickness according to claim 4 attached to an end of the lens barrel closest to the objective.

12. A field lens comprising:
a lens barrel having a tubular shape;
a plurality of lenses accommodated within the lens barrel, wherein the field lens is configured to use the plurality of lenses to correct aberrations due to a glass plate having a predetermined thickness being interposed between the lens barrel and an objective,
the adapter correcting for glass thickness according to claim 5 attached to an end of the lens barrel closest to the objective.

13. A field lens comprising:
a lens barrel having a tubular shape;
a plurality of lenses accommodated within the lens barrel, wherein the field lens is configured to use the plurality of lenses to correct aberrations due to a glass plate having a predetermined thickness being interposed between the lens barrel and an objective,
the adapter correcting for glass thickness according to claim 6 attached to an end of the lens barrel closest to the objective.

14. A field lens comprising:
a lens barrel having a tubular shape;
a plurality of lenses accommodated within the lens barrel, wherein the field lens is configured to use the plurality of lenses to correct aberrations due to a glass plate having a predetermined thickness being interposed between the lens barrel and an objective, the adapter correcting for glass thickness according to claim 7 attached to an end of the lens barrel closest to the objective.

* * * * *